Figures 1, 1A:
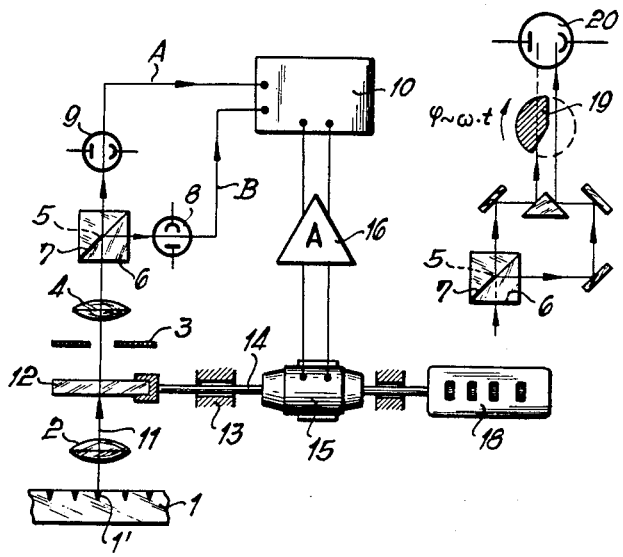

Sept. 25, 1962  C. KUEHNE  3,055,263
OPTICAL APPARATUS FOR DETERMINING THE POSITION OF AN OBJECT
Filed June 15, 1959  2 Sheets-Sheet 1

INVENTOR
Christoph Kuehne

By:
Samuel W. Kipnis.
Atty.

Sept. 25, 1962   C. KUEHNE   3,055,263
OPTICAL APPARATUS FOR DETERMINING THE POSITION OF AN OBJECT
Filed June 15, 1959   2 Sheets-Sheet 2

INVENTOR
Christoph Kuehne
BY Samuel W. Kipnis
Atty.

United States Patent Office 3,055,263
Patented Sept. 25, 1962

3,055,263
OPTICAL APPARATUS FOR DETERMINING THE POSITION OF AN OBJECT
Christoph Kuehne, Berlin-Zehlendorf, Germany, assignor to Askania-Werke A.G., Berlin-Friedenau, Germany, a corporation of Germany
Filed June 15, 1959, Ser. No. 820,333
Claims priority, application Germany June 14, 1958
11 Claims. (Cl. 88—14)

This invention relates to apparatus for determining the position of an object such as a division mark of a circle. The invention aims at high sensitivity in such determinations. A particular object is that the sensitivity of such determination should not be altered by practically unavoidable variations of dimensions of the object, for instance by variations, of the widths of different graduation marks of a circular scale. This latter object is important in many cases and particularly in the event that the signal indicative of position of an object serves as input of a regulating or controlling system, wherein uniformly reproducible results are desired.

Heretofore a number of measures have been taken to produce constant sensitivity in a system of the general type referred to and particularly in such a system wherein differential photometry is employed. For instance, great care has been taken to properly regulate the intensity of the object-illuminating light, source, also to control the parameters of amplifying and similar components in the photometer circuit, and to avoid disturbance in similar respects. It has however been found that substantially completely constant sensitivity could not be achieved in many cases even if all precautions thus far considered were taken.

Upon an intensive study of the problem it has been found that the difficulty lies in the presence of variations of the dimensions of the object or objects, for instance of scale division marks, the positions of which are desired. Even precision circular scales and the like have markings of widely variable width. The average width of such marks may be of the order of six to eight microns but the individual widths may vary appreciably, thereby greatly affecting, as has been found, the sensitivity of differential photometers means for measuring the positions of such marks.

An attempt to eliminate such variations and to provide marks of strictly uniform width is conceivable, but it would lead to enormous difficulties and costs. Also, in other fields, any attempt to produce uniformity of the monitored object would simply fail. It has therefore been investigated whether constant sensitivity can be achieved even in the presence of variable object dimensions.

This was found to be possible in accordance with the present invention by employing a light contrast field such as an aperture member or diaphragm of a certain form and arrangement, not hitherto employed in this field. Briefly, the embodiments of the new arrangement later to be described are based on imaging the object along the diagonal of a preferably rhombic or rhomboidal aperture. By this seemingly simple expedient a dramatic improvement of constancy of sensitivity of the entire system has been achieved, in comparison with the conventional uses of circular, rectangular and other apertures, when used with the common type of photometric system having an output responsive to both the difference and the sum of the illuminations of opposite sides of the field.

Figure 2:
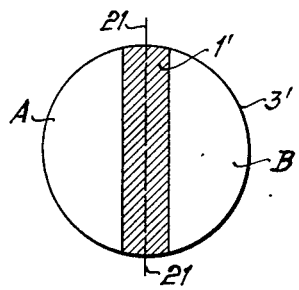
Figure 2A:
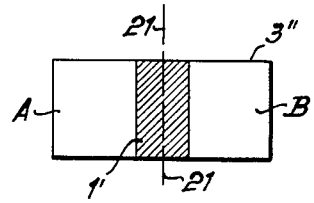
Figure 3:
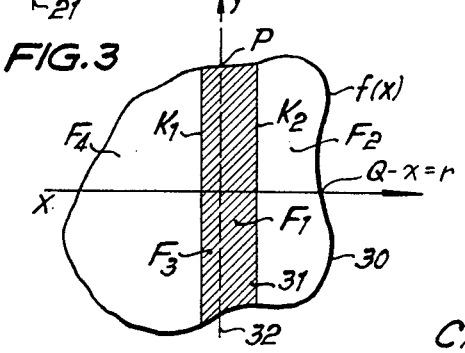
Figure 4:
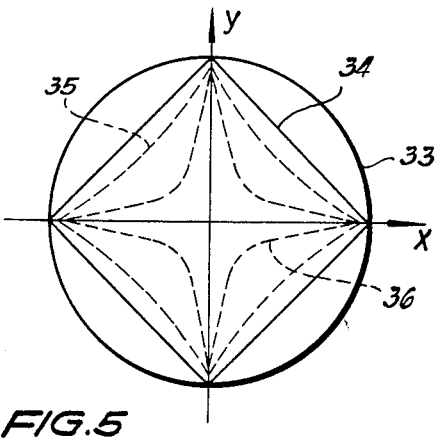
Figure 5:
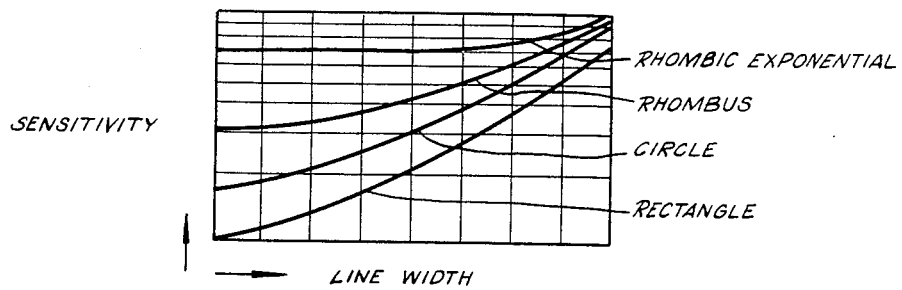
Figure 6:
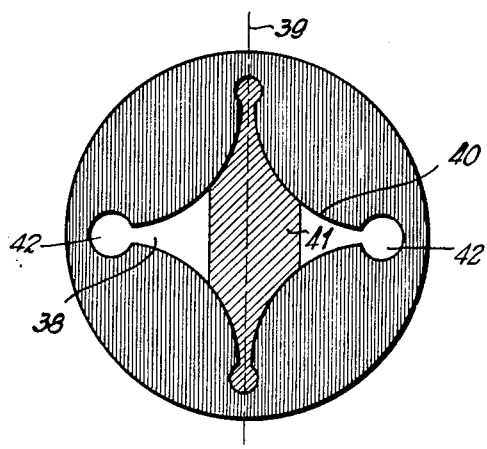
Figure 7:
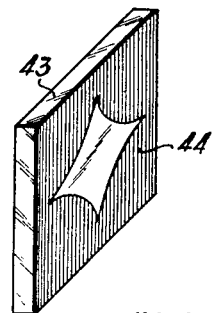

In the appended drawing, FIGURE 1 is a schematic view of an instrument embodying the invention. FIGURE 1a is a similar view of part of a modified instrument. FIGURES 2 and 2a are schematic representations of typical aperture arrangements, in such an instrument, as heretofore used. FIGURE 3 is a highly schematic respresentation of a generalized form of aperture arrangements in accordance with the invention. FIGURE 4 is a view generally similar to FIGURES 2 and 3 but illustrating in solid and dotted form various aperture arrangements in acordance with the invention. FIGURE 5 is a graph of sensitivity functions of the different types of apertures with varying width of marker lines used in the instrument. FIGURE 6 is a front view of a modified form of aperture member according to the invention, and FIGURE 7 is a perspective view of another modified form of aperture member according to the invention.

FIGURE 1 shows a portion of a precision circular scale 1, for instance that of a theodolite, with marks 1' thereon, which marks may for instance designate fractions of an angular second. As already mentioned, they may be typically about seven microns wide but their width may for instance vary by plus or minus 1½ microns. It may be noted at this point that the invention is not particularly concerned with problems such as the counting of such marks, or measurements of distances therebetween, but with the problem of maintaining high and constant sensitivity, in spite of variable width, in optically positioning and locating such marks within a field of view, for the purpose to be described presently. At this point it may be noted that the marks may be black on white, or white on black, or luminescent on non-luminescent, etc.; and different degrees of transparency or opacity may be involved in the mark and background areas.

An optical imaging system 2 images, as shown, one of the marks 1' in the plane of aperture member 3 provided in accordance with the invention. The image formed in this aperture plane is transported by optical imaging system 4 into the plane of an image splitting edge 5 in an optical image splitting system 6, provided for instance by a pair of prisms having diagonal planes in contact and having one half of the interface mirrorized by coating 7. Edge 5, which runs at right angles to the plane of the plane of the paper of the drawing, constitutes the limit of this coating, and serves to divide the light beam from aperture 3 into a pair of beams for comparison by a known process of differential photometry.

According to FIGURE 1 this process is carried out by a pair of photocells 8, 9 receiving respectively the light reflected and transmitted at splitting edge 5 and thus producing electrical output signals A, B of the optical system for comparison in a circuit 10. It is often preferred, however, to proceed in accordance with FIGURE 1a, where the two light streams, from the image splitter 6, are directed by suitable optics onto a single photocell 20, via light alternator-chopper means or shutter 19, revolving at suitable velocity $\varphi$.

Returning to FIGURE 1, the output of comparison circuit 10, proportional, as is conventional, to the ratio of the difference to the sum of the two signals, and amplified at 16, is impressed on a servomotor 15 which rotates a shaft 14 journalled at 13 and thereby turns an optical micrometer 12 formed by a plane-parallel plate of glass. Although the drawing shows the shaft 14 as lying in the plane of the paper, and the plate 12 accordingly rotating in a plane at right angles to said plane, it will of course be understood that in fact the plate rotates in the plane of the paper. In other words, micrometer plate 12 is moved in the plane in which marks 1' move, or in a plane parallel thereto. By such movement of said plate, the object image in aperture 3 is shifted, together with the object image in prism system 6. By such micrometric shifting the latter image can be brought onto, and centered relative to, the splitting edge 5, even if the mark 1' to be observed is not centered on axis 11 of optical systems 2 and 4. This can also be stated by saying that the micrometer serves to interpolate scale 1. Such interpolation can further be indicated by a counter 18, driven by motor 15 through shaft 17.

The invention is not particularly concerned with any of the details of comparison circuits 10 or amplifiers 16, which are sufficiently known to the art and are therefore shown only in block form. The invention is, however, concerned with the object of obtaining high and constant sensitivity in the interpolating system 2 to 19; and this, as mentioned, has been achieved by shaping aperture member 3 in accordance with FIGURES 4, 6 or 7, rather than in accordance with the conventional ararngements of FIGURES 2 or 2a.

In FIGURE 2, numeral 3' indicates the inner edge of the usual, circular diaphragm and 1' appears, due to magnification by system 2, as a band running across the circular opening. By means of line 21, the centerline of the aperture, established by image splitting edge 5, has been indicated. The arrangement is similar in the conventional rectangular arrangement of FIGURE 2a, where the mark image extends parallel to two of the sides of the aperture 3". It will be understood that, as either circle 1 or micrometer 12 moves, image 1' runs from right to left or from left to right across field of view 3" or 3'. It will further be understood that for the desired automatic positioning of the mark image, on center line 21, by photometer system 10 or 20, measurements and comparisons of light fluxes, right and left of 21, must be performed; and as indicated above, it has been found that the sensitivity of such measurements, when performed with the aid of apertures 3' or 3" arranged as shown, is adversely affected by variations of the width of 1'.

It has, however, been found that a marked improvement is obtained by rearranging the system of FIGURE 2a so that the mark runs and moves diagonally, rather than parallel to the sides of the aperture as shown. This leads to the rhombic aperture 34 of FIGURE 4, in lieu of the apertures heretofore described.

It has further been found that added and very substantial improvement is possible by certain rhomboid forms of the diaphragm, as will now be explained, with the aid of FIGURE 3. This figure indicates a generalized aperture of outline 30, the effect of which may readily be analyzed as to the sensitivty of photometric work achievable thereby. Object or mark image 31 is imperfectly centered on one axis $y$ of this aperture, in its movement along the other axis $x$. The vertical axis $y$ splits image 31 into a pair of parallel strips F1, F3 and right and left of these respective strips the field of view includes background areas F2, F4, separated from the strips by border lines K2, K1 respectively. Axes $y$ and $x$ intersect aperture 30 at points P, Q and the aperture outline can be considered as a curve corresponding to some function $f(x)$.

In order to find said function and that form thereof which insures maximum sensitivity of comparison of areas F1 and F2 with areas F3 and F4—presupposing uniformity of illumination densities in F2 and F4—the following must be considered. The photometric device of FIGURE 1 or that of FIGURE 1a compares light streams passing through areas F2 and F4, at light flux density B0. The light streams passing through F1, F2, F3 and F4 are respectively given by the following equations (1)
$$\phi 1 = \lambda B0 F1$$
$$\phi 2 = \mu B0 F2$$
$$\phi 3 = \lambda B0 F3$$
$$\phi 4 = \mu B0 F4$$

where $\phi 1$ etc. designate the light streams; $\lambda$ and $\mu$ designate contrast values variable between zero and unity; and it is understood that $\lambda = 0$ designates a perfectly opaque mark in a bright background and $\mu = 0$ designates the other extreme. The width $F1 + F3$ of mark 31, which as mentioned is variable, can be represented by variable $2b$; and the abscissa of boundary K2 can be represented by $x$. The total values of light streams $\phi 1$ and $\phi 2$ (right of $y$) and $\phi 3$ and $\phi 4$ (left of $y$) are:

(2)
$$\Phi \text{ right} = B0\left[\lambda \int_0^x f(\xi)d(\xi) + \mu \int_x^r f(\xi)d(\xi)\right]$$

$$\Phi \text{ left} = B0\left[\lambda \int_0^{2b-x} f(\xi)d(\xi) + \mu \int_{2b-x}^r f(\xi)d(\xi)\right]$$

The sensitivity of the photometric device increases as an increase is caused in the difference between $\phi$ right and $\phi$ left for the sum of all light streams upon a predetermined shift of mark 31 in field 30. The relative light stream difference is given by (3)
$$\delta\Phi = \frac{\Phi \text{ left} - \Phi \text{ right}}{\Phi \text{ left} + \Phi \text{ right}}$$

The sensitivity of the device can be suitably defined as (4)
$$E = \left[\frac{d\delta\Phi}{dx}\right]_{x=b}$$

which expression will be seen to be dependent on the width $2b$ of mark 31, on transparency-opacity parameters $\lambda$ and $\mu$, and on function $f(x)$; the width $b$ being variable between a minimum $b1$ and a maximum $b2$.

Equation 4 can be further analyzed according to known principles, for minimum variation of E at maximum variation of $b$; the details are believed not to be required at this point. Suffice it to say that such analysis leads to certain function $f(x)$ providing largely constant sensitivity E. More particularly it leads to the function $$f(x) = CE0 e^{-E0_x}$$

wherein E0 is the desired sensitivity and C is a constant.

This last formula defines the ideal shape of curve $f(x)$ whenever a center point such as P is given. The formula further leads to excellent results. In the event of $\lambda = 0$ (perfectly opaque mark in illuminated field) the sensitivity becomes strictly constant, by the use of the aperture conforming with $f(x)$. In other cases, including that of $\mu = 0$, approximately constant sensitivty is achieved. At any rate, better uniformity of sensitivity is thus achieved than with any other shape of aperture; and this applies regardless of how great the variation between maximum and minimum values $b1$, $b2$ may be. In the region where $x$ is equal to or greater than the maximum width $b2$ the function $f(x)$ can also be replaced by any other function defining a curve which defines an area equal to that defined by $f(x)$ in this region; and similarly when $x$ is equal to or smaller than the minimum width $b1$ conformity of the aperture to the function becomes immaterial to constancy of small-deviation sensitivity.

From the standpoint of practical design it can be noted from the above and has been found to be true that each quadrant of curve $f(x)$ must be the equivalent of an exponential function. In FIGURE 6 such a quadrant is shown at 40; area 37 is opaque and 38 is transparent; the position of the image splitting edge is indicated by 39. This aperture 40, when used as inner edge of the diaphragm in FIGURE 1, produces greatly improved constant sensitivity conditions. The improvement has been obtained by the absence of an aperture edge of inwardly concave form or of inwardly approximately concave form; it will be noted that 40 is inwardly convex. Other details are less significant; thus it is permissible for instance to provide terminal, circular recesses 42 at the apex points of convergent lines 40, where the maximum line width will not extend into this area, as heretofore pointed out, the area of these circles corresponding to the area defined by the asymptotic function beyond this point.

The effects of a variety of forms of aperture have been determined, including (FIGURE 4) rhombic aperture 34, an aperture 35 defined by astroid curves, and an aperture 36 corresponding to the above noted exponential function. It may be noted that each of the three curves can be designated as rhomboid or rhomboidal. Their respective effects as to sensitivity of positioning, as affected by variation of object dimensions, are plotted in FIGURE 5. In this graph the lowermost curve represents sensitivities of a circular aperture; the next higher one, those of rhombus 34; the next, those of flat rhomboidal curve 35; and the uppermost, those of deeply curved rhomboidal line 36 approximating exponential shape. Variations of object width are plotted along the horizontal coordinate; those of sensitivity to small displacement, along the vertical coordinate.

Although, as indicated above, the most desirable shapes into which the light-contrast image may be formed by the aperture to make sensitivity independent of line width have been discussed above from the mathematical standpoint, the manner of calculating optimum conditions being briefly indicated, the nature of the improvement provided by the present invention may perhaps be more readily understood from the more qualitative comparison of the performance obtained from the various shapes illustrated which may be derived from the equations above given. As is well known in the art, photometric comparison systems of the general type here involved employ comparison circuits which respond to the ratio of the illumination difference to the illumination sum, in the two areas in order to make the sensitivity substantially independent of variations in intensity of the light source and similar variables, which would cause error if the total illumination were to be disregarded in the comparison.

It will be seen that a square or rectangle such as shown in FIGURE 2a produces a very great variation of sensitivity with line width. With this shape or geometry, the difference in illumination of the two areas created by a small unit displacement of the line from exact center is substantially independent of line width, i.e., the difference in illumination of the two areas for a small unit displacement will be the same for any line width irrespective of the fact that wider lines produce smaller total illumination. Thus, as indicated in the lowermost curve in FIGURE 5, virtually any line width variation produces radically varying sensitivity.

Considering next the circle, used heretofore as a diaphragm for the mere purpose of defining a fixed area, as is conventional in optical systems of all types, it will be seen that the result obtained here is somewhat better than the rectangle or square as regards constancy of sensitivity with line width, since both the difference in illumination produced by unit deviation of the line and the sum of the illumination of the areas both fall as the line width is increased, in the illustrated case of a dark line on a light background. However, here again, as shown in FIGURE 5, the gradient of sensitivity as a function of line width remains everywhere great. Although, in the case of the circle or other inwardly concave curve, the maximum dimension of the background frame in the direction parallel with the line image (this dimension approximately determining the illumination difference created by small unit displacement of the line) is at the center of the standard position and this dimension diminishes with increasing sidewise distance from the center, the rate of diminution of this dimension parallel with the line is small near the center (i.e., for narrow lines) and is increasing throughout with increasing sidewise distance from the center, and the illumination difference produced by small unit line deviation cannot remain approximately proportional to the illumination sum.

In the case of the rhombus (or the diagonally oriented rectangle whose superiority led to the more refined aspects of the present invention, as pointed out above), the diminishing of the parallel dimension occurs at a rate which is non-increasing (a constant in this instance), and a substantial improvement over both the rectangle and the circle is observed, since the diminishing of both the total illumination and the difference produced in the two halves of the area by a small unit movement of the line are beginning to approach proportionality.

When the sides of the rhombus are made concave inwardly in the form of an astroid, the dimension parallel with the line is decreasing at a rate which itself decreases with distance from the center, and the optimum condition is produced by the negative exponential form producing proportionality between the two factors of the ratio defining the sensitivity, as pointed out above. As indicated in FIGURE 5, it is impossible to obtain complete constancy of sensitivity to the very edges of practical embodiments because of limitations on ability to produce exact realization of theoretical conditions because of second-order effects such as variations from theoretical focussing accuracy, etc., but the tremendous improvement is apparent.

The physical nature of the new aperture member is apparent from FIGURE 7. A glass carrier 43 has an opaque coating 43 thereon, applied for instance by a photographic process; and such coating has a central area of rhomboidal form, as described, the arrangement in the instrument being such that movement of the object image occurs along one of the diagonals of said area.

Many variations are possible. Adaptation of the principles above to many similar forms of photometric system will readily be made. As examples, although the presently illustrated pattern forms are completely symmetrical with respect to centers parallel and perpendicular to the line image, it will be obvious that the invention may be employed to produce many forms not having such symmetry without losing many of the advantages of the form illustrated. Likewise, although the invention is here illustrated with an opaque marker on a uniform white background, and the frame in which the image is formed is a shaped aperture, the teachings of the invention will readily be adapted by persons skilled in the art to light-contrast patterns in which the line, rather than the background, is illuminated, and to the employment of central masking areas of suitable shape in a pattern which is otherwise round, rectangular, etc., forming more or less annular illumination patterns with the same over-all result as the patterns presently illustrated.

What is claimed is:

1. In apparatus for objectively determining the position of a line comprising means for forming a dark line image on a light background, means for splitting the image into partial images including a splitting edge extending parallel with the image, and means for photometrically comparing the partial images, the improvement which comprises an aperture member between the image-forming means and the comparing means having a generally rhomboidal aperture with a diagonal effectively parallel to said edge; and means for imaging the object through said aperture for the photometrical comparison, the comparing means being responsive to both the sum and the difference of the partial images, so that variations in sensitivity due both to variations in line width and to changes in background illumination and similar extraneous factors are minimized.

2. Apparatus as described in claim 1 wherein the sides of the rhomboidal aperture are convex toward the inside of the aperture.

3. Apparatus as described in claim 2 wherein the convex sides form curves corresponding to an exponential function of distances from said diagonal.

4. Apperatus as described in claim 1 additionally having means responsive to the comparing means to restore the line image to the balanced condition upon deviation therefrom, and indicating means for showing the amount of motion required for such restoration.

5. A photometric system for indicating sidewise deviation of lines of varying widths from a standard position comprising means for forming a light-contrast image of the line, means for comparing the illumination in similar areas on both sides of the standard-position center of the image to detect sidewise deviation of the line, whereby the sum of the illumination in both areas varies with width of the line image, and means responsive to variation in width of the line image to change the difference in illumination of the two areas occurring in response to a small deviation from the centered position of the line substantially in proportion to said sum, the comparing means being responsive to both the difference and the sum, so that variations of sensitivity due to all extraneous factors including variations in line width are minimized.

6. A system of claim 5 wherein the difference-changing means comprises a masking member having opaque and transparent portions in the path of the light-contrast image, the transparent portion having dimensions in the direction parallel to the line varying along the direction perpendicular to the line in proportion to the light-transmittal area bounded by the edges of the line.

7. In a photometric system for indicating sidewise deviation of a line from a standard position comprising means for forming an image of the line extending across a uniform light-contrast background frame, the total illumination of the portions of the background frame on opposite sides of the center of the frame being equal in a standard position of the line, and means for comparing the illumination of the portions of the frame on opposite sides of the center to detect deviation from the standard position, the improved construction wherein the comparing means is responsive to both the difference and the sum and the background frame has a dimension in the direction parallel with the line image which varies with distance from the center line in both directions from the center of the line image, the variation being in the direction to decrease said dimension at the edge of the line image with decrease of total illumination produced by line width variation, the rate of such decrease being a non-increasing function of distance from the center, so that the illumination difference produced by any small given motion of the line from the centered position has substantially the same relation to the illumination sum, irrespective of the width of the line.

8. In a photometric system for indicating sidewise deviation of a line from a standard position comprising means for forming a dark image of the line extending across a uniform light background frame, the total illumination of the portions of the background frame on opposite sides of the center of the frame being equal in the standard position of the line, and means for comparing the illumination of the portions of the frame on opposite sides of the center to detect deviation from the standard position, the improved construction wherein the maximum dimension of the background frame in the direction parallel with the line image is at the center of the standard position of the line image and said dimension of the frame diminishes at a non-increasing rate from said maximum with increasing sidewise distance from the center in each direction, the comparing means being responsive to both the sum and the difference of the illumination of the respective portions, so that the extent of deviation from centered position indicated by the comparison means is substantially independent of extraneous factors including line width.

9. The photometric system of claim 8 wherein the dimension of the frame in the direction parallel with the line image is a negative exponential function of distance from the center line.

10. The photometric system of claim 8 wherein the change in the ratio of the difference to the sum of the illuminations of the two respective portions produced by the small shift of the line from the standard position is a constant independent of line thickness.

11. A photometric system for indicating deviation of a light-contrast marker from a centered position in a background field having means for producing signals representative of the illumination of respective opposite sides of the center-line of the field and means for producing an indication responsive to both the difference and the sum of said signals, whereby such indication is representative of the magnitude of the deviation from the centered position in a manner substantially independent of the intensity of illumination, the field having its opposite sides of a shape producing a substantially constant ratio of differential illumination to total illumination in response to the same amount of sidewise motion of markers of different width.

References Cited in the file of this patent

UNITED STATES PATENTS

| | | |
|---|---|---|
| 2,277,285 | Woodling | Mar. 24, 1942 |
| 2,410,550 | Padva | Nov. 5, 1946 |
| 2,419,641 | Hart | Aug. 29, 1947 |
| 2,654,027 | Baum | Sept. 29, 1953 |
| 2,659,828 | Elliot | Nov. 17, 1953 |
| 2,870,671 | Falconi | Jan. 27, 1959 |
| 2,899,857 | Rockafellow | Aug. 18, 1959 |
| 2,961,917 | Werner | Nov. 29, 1960 |